United States Patent

[11] 3,584,691

[72] Inventor Aaron G. Reynolds
 2219 North 12th, McAllen, Tex. 78501
[21] Appl. No. 772,108
[22] Filed Oct. 31, 1968
[45] Patented June 15, 1971

[54] CENTRAL SUPPORT SYSTEM FOR LAND SMOOTHING IMPLEMENTS
 8 Claims, 8 Drawing Figs.
[52] U.S. Cl. ................................................. 172/239,
 172/780, 172/413
[51] Int. Cl. ..................................................A01b 63/111
[50] Field of Search........................................... 172/239,
 780, 779, 413, 424

[56] References Cited
UNITED STATES PATENTS

| | | | |
|---|---|---|---|
| 761,027 | 5/1904 | Bieler | 172/424 X |
| 1,247,764 | 11/1917 | White | 172/424 X |
| 2,004,846 | 6/1935 | Allison et al. | 172/413 |
| 2,283,744 | 5/1942 | Lethlean | 172/779 |
| 2,503,638 | 4/1950 | Shuey | 172/779 |
| 2,650,441 | 9/1953 | Shumaker | 172/779 |
| 2,659,166 | 11/1953 | Mathias | 172/780 X |
| 3,110,973 | 11/1963 | Reynolds | 172/239 X |
| 3,237,324 | 3/1966 | Eddins | 172/780 |

Primary Examiner—Robert E. Bagwill
Attorney—Bacon & Thomas

ABSTRACT: A supplemental central support system for a land smoothing implement which varies the amount of yieldable support it furnishes to the implement in response to irregularities in the soil surface contour and texture in a way beneficial to the function of that implement, furnishing more support on soft soil and less support on firm soil. The support system includes a pair of forwardly extending support arms pivoted centrally thereof for movement in a vertical plane to a bracket mounted on the implement frame, the forward end of each support arm carrying a wheel and the rear end of each having an upwardly projecting lever arm thereon to which a spring is connected. A varying portion of the implement weight is supported by the central support wheels and the associated support arms, the springs and the lever arms being so arranged that when the support wheels move progressively downward relative to the implement frame a progressively increasing upward force is exerted on the frame.

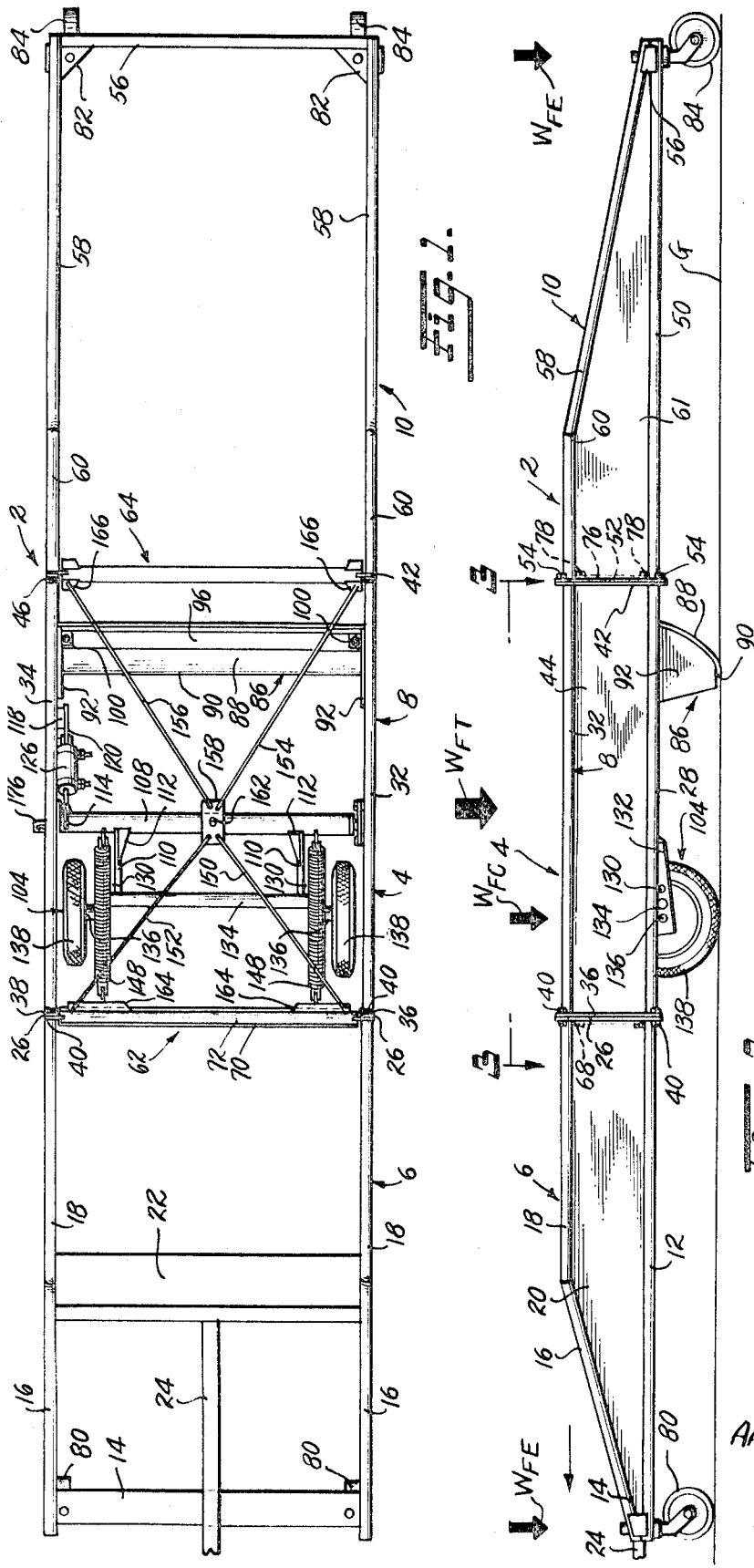

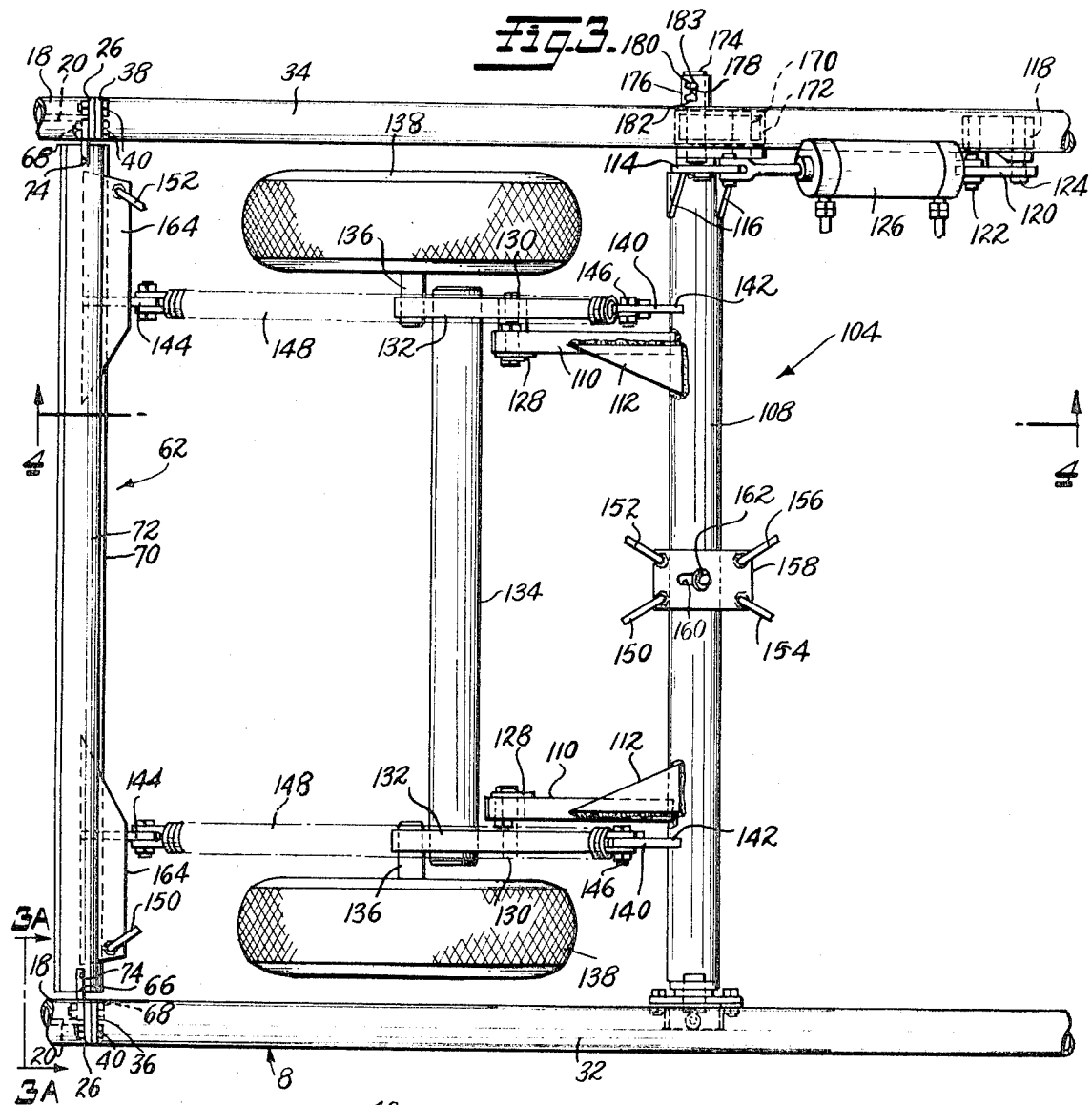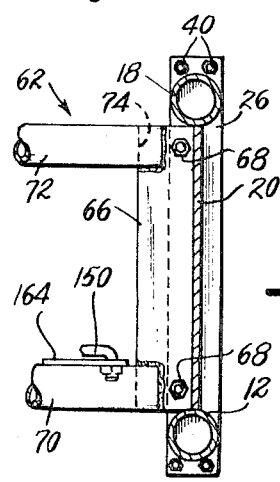

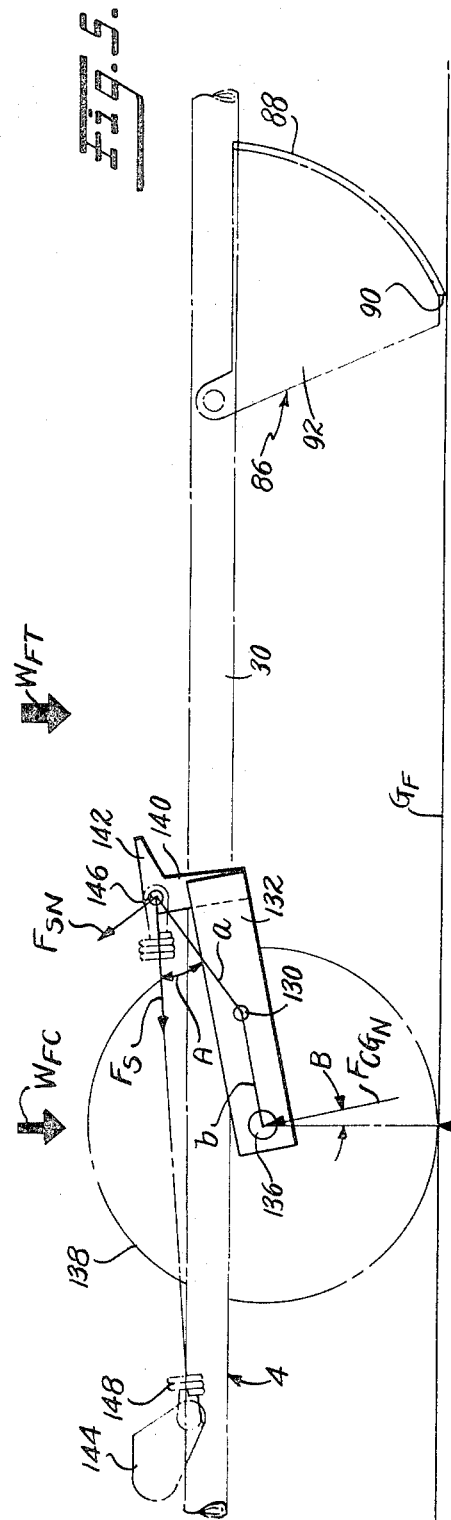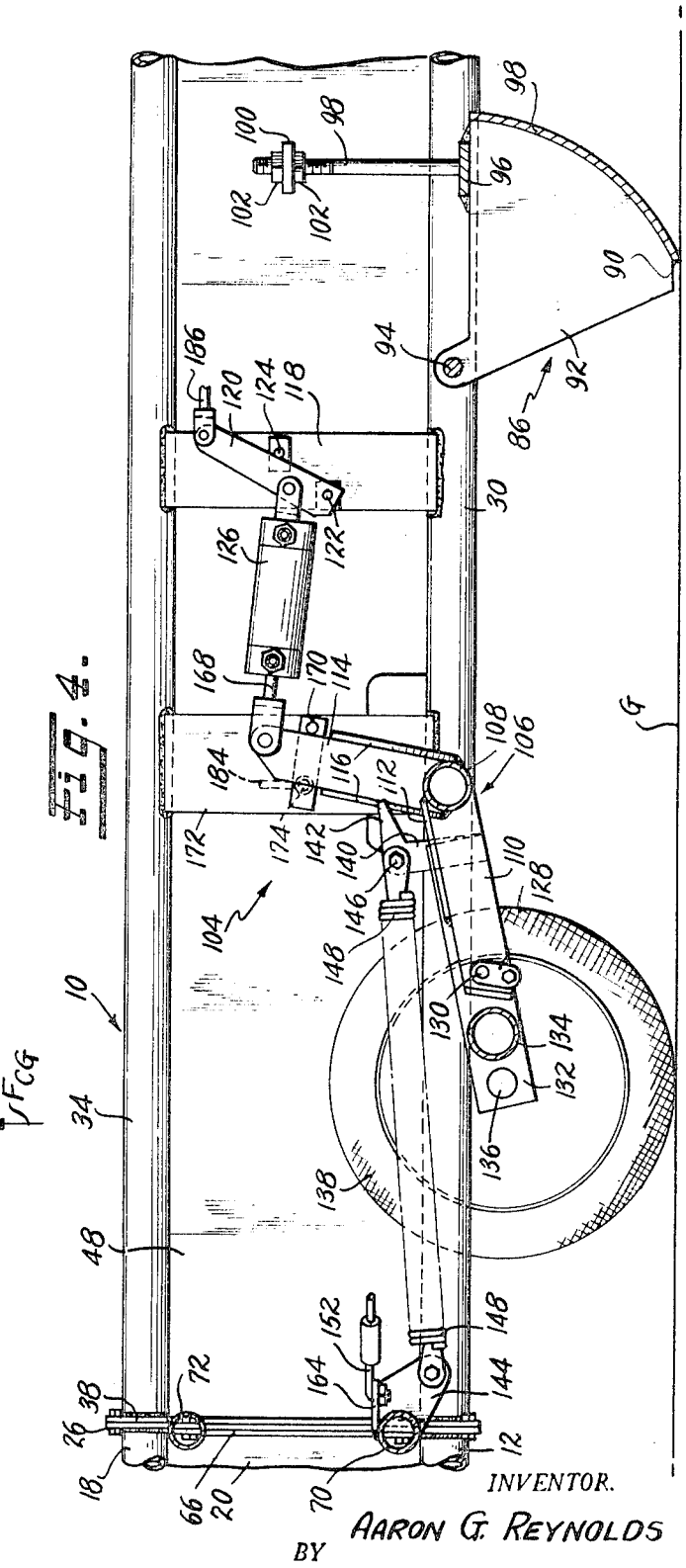

INVENTOR.
AARON G. REYNOLDS
BY
Bacon & Thomas
ATTORNEYS

CENTRAL SUPPORT SYSTEM FOR LAND SMOOTHING IMPLEMENTS

BACKGROUND OF THE INVENTION

1. Field of the Invention

This invention relates generally to implements for smoothing soil surfaces. More particularly, it relates to a yielding central support system for use with such an implement, the implement including an elongated, relatively rigid frame carried by support means at its opposite ends and having a centrally positioned blade mounted therebelow.

2. Description of the Prior Art

In modern agriculture and elsewhere it frequently is desirable to smooth soil surfaces, in order to obtain a more suitable topography for farming operations, to improve drainage conditions or for irrigation purposes, to prepare aircraft runways or roadway surfaces, and for like reasons. Many implements have been developed for smoothing soil surfaces, particularly for application in agriculture. Most commonly known as "levelers" or "land planes," these soil smoothing implements are of various configurations, but generally have a central blade mounted on a longitudinally elongated frame that is carried by support means at its extremities and adapted to be towed lengthwise across the ground by a tractor or the like. A typical implement of this type may measure from 40 to 90 feet in length, and includes a blade of 8 to 12 feet in length mounted transversly centrally beneath an elongated frame that is carried at its opposite ends either on pneumatic or steel-rimmed wheels, or on skids. As another alternative, the forward end of the implement frame can be carried directly upon the drawbar of the towing vehicle.

In use, the implement is towed across the ground, and the centrally positioned blade planes or cuts away earth in elevated areas and spreads it into depressions, so that a continuous cut and fill process occurs. It can be seen that if the cutting edge of the blade is maintained in a common plane with the lower extremities of the support means carrying the opposite ends of the implement frame, the blade will serve at any instant in time to create a new surface elevation for the soil that is an average of the elevations of the soil at the two separated end support means. Although ideally it is desirable that the blade of the implement impart no weight change to the frame, as a practical matter the blade will tend to be lifted by hard soil and will tend to assume weight from accumulated soil. Again, although it is desirable that the frame of the implement be constructed perfectly rigid in the vertical plane, the weight and inherent flexibility of structural materials impose practical limitations on the rigidity achievable, so that a degree of inherent flexibility will always exist. Thus, the frame deflection resulting from the variations in loading of the frame caused by the blade as it is lifted or assumes weight will cause variations in the elevation of the blade relative to the plane common to the end support means.

Further, while ideally the end support means positively support the extremities of the frame in constant vertical relationship to the surface, the end support means will actually penetrate the surface to a greater or lesser degree depending upon the soil softness and the flotation characteristic of the support means. It has been found that soil penetration may be effectively minimized by the use of skids as the end support means. The problem of high power requirement and high rate of wear of skids moving over the soil surface is to a large extent alleviated when skids are used in combination with a yieldable support means, the subject of U.S. Pat. No. 3,110,973 issued to the applicant on Nov. 19, 1963. Other end support means such as low pressure pneumatic tires also minimize soil penetration, but the existence of a variable load in the frame resulting from alternate loading and unloading of the blade as described causes deflection in such tires, and the variation in the support level at the extremities of the frame therefore still exist.

In an attempt to alleviate the problems described and to more accurately regulate the elevation of the cutting blade, supporting wheels can be yieldably mounted near the center of the frame of the implement. While this permits the end support means to more accurately read the surface elevations at the extremities of the frame due to decreased load, there still exists a tendency for the supplementary support means to fall into soft soil and ride over hard soil, varying the amount of support at the center of the frame and thereby permitting the vertical deflections to occur in the frame.

A need thus exists for a central support system to be used with a land smoothing implement of the general type described, designed to augment the support of the central section of the implement's relatively rigid but to a degree flexible supporting frame in the presence of varying soil conditions, and to be effective in more accurately regulating the elevation of the cutting blade.

SUMMARY OF THE INVENTION

The invention relates to a central support system for a land smoothing implement including a longitudinally elongated frame that is substantially resistant to vertical deflection, but which is nevertheless inherently flexible to a degree. The opposite ends of the frame are carried over the soil surface by supporting means, and a scraper blade is mounted transversly centrally beneath the frame.

The central support system of the invention includes forwardly extending support arms that are pivoted centrally thereof to a bracket carried by the elongated frame of the implement, the bracket being mounted for movement between a working position and a transport position. The support arms are located forwardly of the scraper blade and can move in a vertical plane, and a wheel is mounted on the forward end of each. The rear end of each support arm has an upwardly extending lever arm thereon, and spring means is connected between each lever arm and the supporting frame. The spring means and the lever arm for each supporting arm are uniquely arranged, so that when the bracket is in a working position and the wheel moves progressively downwardly, a progressively increasing upward force is exerted on the elongated frame.

The weight of the elongated frame is supported in part by the support means at each end of the frame, and in part by the central supporting structure. The spring means, the lever arms and the supporting arms function to change the proportion of the total weight supported by the central supporting structure as soil conditions change, the manner in which this occurs being as follows:

With the bracket in working position and the implement in operation, assume a given instant in time at which the scraper blade and the central supporting wheels are engaged with fairly firm soil. At this instant in theory a given proportion, $W_{FE}$, of the total weight, $W_{FT}$, of the elongated frame will be borne by the end support means, and the remainder, $W_{FC}$, of said weight $W_{FT}$ will be borne by the central supporting structure. In practice, the scraper blade may support some of the weight of the implement frame, but such is not considered in this discussion.

Assume now that the implement is moved forwardly, until the end support means rest on firm soil while the central supporting wheels rest on soft soil. If the implement frame were perfectly rigid, then the center wheels would not sink into the soil and instead the end support means would assume weight from the center wheels. However, the relatively rigid, elongated frame is inherently flexible to a degree, and thus if the center wheels were mounted in a normal or usual manner they would sink into the soft soil and the center of the frame would deflect downwardly somewhat, thus causing the scraper blade to cut too deeply into the soil. This is a condition which the present invention alleviates, because of the unique mounting arrangement for the center wheels.

In the invention as the implement moves forwardly into the region of soft soil, the wheels of the central supporting structure tend to sink into the soil so that they move downwardly relative to the elongated frame. As this downward movement progresses however, the spring means and lever arms function to place a progressively increasing upward force on the elongated frame, causing it to move toward bowing or deflecting upwardly rather than in the normal downward direction. This relative upward deflection of the frame transfers weight from the end support means to the central support wheels, and also tends to stabilize or control the depth to which the scraper blade cuts. With proper design of the central support system it is possible to control deflections of the frame and the proportionate weight borne by the central wheels, to maintain a fairly constant depth of cut as the implement moves from a region of fairly firm soil into a region of soft soil. The invention will function in an opposite but like manner as the implement moves from soft soil onto more firm soil.

The support system of the invention is also designed so that the central wheels can be utilized in transporting the implement. A hydraulic jack is connected between the supporting frame of the implement and the bracket carrying the support arms, and is operable to shift the central wheels into a transport position wherein the scraper blade and the caster wheels of the end support means are elevated off the ground. The implement can then be towed by a tractor or other vehicle from one location to another.

It is an object of this invention to provide a central support system for a land smoothing implement of the type described, constructed and arranged to reverse the normal deflections of the elongated, longitudinally relatively rigid but to a degree inherently flexible frame of the implement, and to automatically adjust the proportionate weight carried by support wheels mounted centrally of the implement in response to changing soil conditions.

Another object is to provide a land smoothing implement of the type described, including a central support system constructed and arranged to control the cutting depth of the implement's scraper blade in the presence of varying soil conditions.

Still another object is to provide a central support system that is designed to be movable from a working position to a transport position, wherein the support wheels of the system can be utilized to transport the implement.

A more specific object is to provide a support system for connecting a ground-engaging wheel to a frame, designed to place an upward force on the frame that progressively increases in value as the wheel moves downwardly relative to the frame.

Other objects and many of the attendant advantages of the invention will be readily apparent from the following description of the preferred embodiment, when taken in conjunction with the accompanying drawings.

DESCRIPTION OF THE DRAWINGS

FIG. 1 is a top plan view of the land smoothing implement of the present invention;

FIG. 2 is a side elevation of the implement of FIG. 1;

FIG. 3 is an enlarged fragmentary plan view taken substantially on the line 3—3 of FIG. 2;

FIG. 3A is a vertical sectional view taken on the line 3A—3A in FIG. 3, showing details of the elongated frame;

FIG. 4 is a fragmentary longitudinal sectional view taken on the line 4—4 of FIG. 3, showing details of the scraper blade and the central supporting system;

FIGS. 5 and 6 are schematic force diagrams illustrating the principle of the mechanism for adjusting the proportion of the weight of the implement borne by the support wheels.

DESCRIPTION OF THE PREFERRED EMBODIMENT

Figure 7:
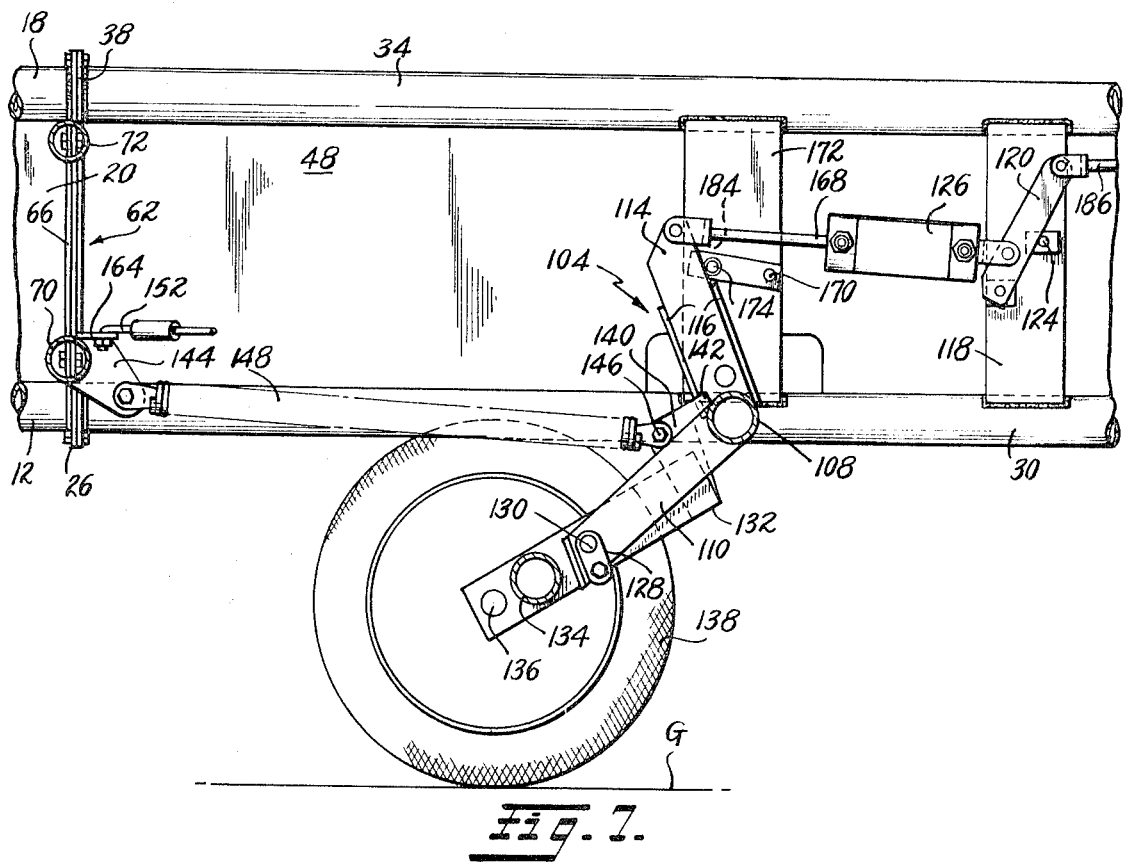
FIG. 7 is a fragmentary sectional view similar to FIG. 4, but showing the support wheels in road transporting position.
Figure 8:
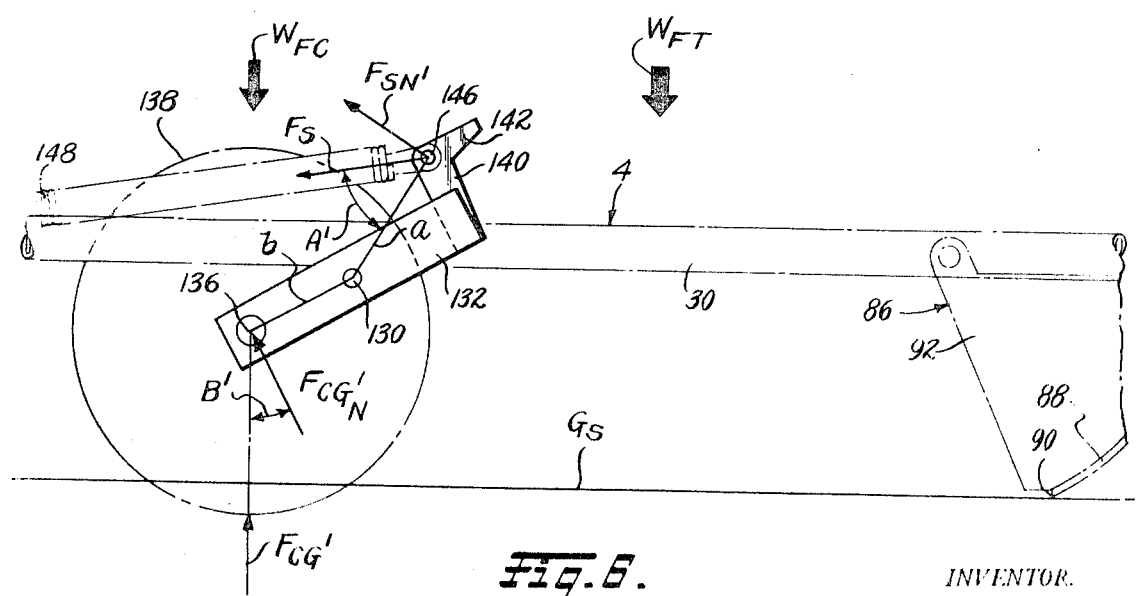

Referring now to the drawings, the land smoothing implement, or land plane, of the invention is indicated generally at 2, and includes an elongated supporting frame 4 that typically will measure about 60 feet in length. The frame 4 is structurally designed to be as rigid as practical, with the result that some inherent flexibility will be present. Thus, the elongated frame can be described as being substantially or relatively rigid in the longitudinal direction but with a degree of inherent flexibility. For convenience the frame 4 is divided into a forward section 6, a central section 8 and an aft section 10, the three sections being secured together.

The forward frame section 6 includes a pair of parallel lower tubular members 12 each welded at its forward end to a transverse structural member 14. Inclined tubular members 16 are welded at their lower front end to the opposite ends of the transverse member 14, the upper end of each inclined member 16 being welded to a horizontally disposed upper tubular member 18. A reinforcing plate 20 is welded to each lower member 12 and its associated tubular members 16 and 18, and a transverse reinforcing member 22 is welded between the plates 20. A tongue 24 for pulling the implement is welded to the transverse members 14 and 22, and is designed for connection with a tractor or other towing vehicle (not shown). The rear ends of each set of tubular members 12 and 18, and the rear edge of the associated plate 20, are welded to a vertical coupler plate 26.

The central frame section 8 includes a pair of lower tubular horizontal members 28 and 30 and a pair of upper tubular horizontal members 32 and 34, the forward ends of the members 28 and 32 being welded to a vertical coupler plate 36 and the forward ends of the members 30 and 34 being welded to a like vertical coupler plate 38, the coupler plates 36 and 38 being secured to the coupler plates 26 by bolts 40. The rear ends of the tubular members 28 and 32 are welded to a coupler plate 42, and a rectangular reinforcing plate 44 is welded along its edges to the members 28 and 32 and the coupler plates 36 and 42. Similarly, the rear ends of the tubular members 30 and 34 are welded to a coupler plate 46, and a rectangular reinforcing plate 48 is welded to said tubular members and the coupler plates 38 and 46.

The longitudinal expanse of the supporting frame 4 is completed by the aft section 10, which includes a pair of lower horizontal tubular members 50 each welded at its forward end to a coupler plate 52, the coupler plates 52 being secured to the coupler plates 42 and 46 by bolts 54. The rear ends of the members 50 are welded to a transverse structural element 56, to which are also welded the rear lower ends of inclined tubular members 58. Upper horizontal tubular members 60 are welded between the members 58 and the coupler plates 52, and reinforcing plates 61 are welded along the edges thereof to the members 50, 58 and 60 and the coupler plates 52.

The supporting frame 4 is braced by front and rear lateral brace assemblies 62 and 64, respectively, the front brace assembly 62 including a pair of vertical plates 66 secured to the coupler plates 26, 36 and 38 by bolts 68. The plates 66 extend vertically between the tubular members 12 and 18, and project inwardly beyond the edge of the coupler plates 26. A lower tubular brace 70 is welded between the confronting plates 66, the brace 70 having notches in its opposite ends within which the plates 66 are partially received. An upper tubular brace 72, of smaller diameter than the tubular brace 70, is welded between the upper ends of the plates 66, and has notches 74 in its opposite ends for receiving said plates.

The rear brace assembly 64 is of the same construction as the brace assembly 62, and includes a pair of vertical plates 76 secured to the coupler plates 42, 46 and 52 by bolts 78.

The completed elongated supporting frame 4 is substantially rigid in the longitudinal direction, although some degree of flexibility is inherent, and the front end thereof is supported by caster wheels 80 mounted on the transverse member 14. Brackets 82 are welded within the corners of the rear end of the frame 4, and each mounts a caster wheel 84. The caster wheels 80 and 84 provide easy maneuvering for the land plane 2 at economical cost. It is to be understood that the bridgelike supporting frame 4 might be designed otherwise than as shown, without departing from the invention. Further, supporting means other than the wheels 80 an 84 can be employed at opposite ends of the frame 4. For example, a skid arrangement can be substituted for either or both sets of wheels, and the front wheels 80 could be eliminated entirely and that end of the frame could be supported directly by a tractor draw bar.

Mounted transversely on the elongated supporting frame 4 forwardly of the rear section 10 is a scraper blade 86 of the open-bucket type, the blade 86 including an arcuate body 88 that terminates in a lower leading cutting edge 90. End plates 92 are welded to each end of the arcuate blade body 88, and the upper forward corner of said end plates are pivotally secured to the lower tubular members 28 and 30 by pivot pins 94. A bar 96 is welded between the top edges of the end plates 92, and upright adjusting bolts 98 are welded thereto. The upper ends of the bolts 98 pass through brackets 100 welded to the reinforcing plates 44 and 48, and nuts 102 are threaded on said bolts 98. The scraper blade 86 can thus be adjusted to any desired setting.

The central support system of the invention is indicated generally at 104, and incorporates a bracket assembly 106 which includes a transversely disposed, rotatably mounted tubular member 108 extending between the tubular members 28 and 30. Welded to the front surface of the tubular rotatable member 108 are laterally spaced, parallel bracket arms 110, each reinforced by gusset plates 112. The end of the tubular member 108 closet to the tubular member 30 has a vertical crank arm 114 thereon, braced by gusset plates 116. Extending between the tubular frame members 30 and 34 medially of the tubular member 108 and the scraper blade 86 is a mounting bracket 118, to which the lower end of a crank arm 120 is pivoted by a pin 122. A stop pin 124 on the bracket 118 limits rearward pivoting of the crank arm 120, and a hydraulic jack 126 is connected between the crank arms 114 and 120 and is remotely operable to rotate the tubular member 108 between an operating position (FIGS. 1—6) and a transport position (FIG. 7), as will be described.

Secured to the forward end of each bracket arm 110 by a bracket 128 is a horizontal pivot bolt 130, the pivot bolts 130 extending oppositely and passing centrally thereof through rectangular supporting arms 132. The supporting arms 132 are thus mounted for pivotal movement in vertical planes, and are interconnected by a tubular member 134. An axle 136 is secured to the forward end of each supporting arm 132 to extend laterally outwardly, and a wheel 138 is mounted on each axle.

Welded to the rear end of each supporting arm 132 is an upright lever arm 140, including a rearwardly extending stop 142 on the upper rear edge thereof that is engageable with the tubular member 108 to limit upward pivotal movement of the wheel 138 relative to the bracket arms 110. Secured to the transverse tubular brace member 70 are spring brackets 144, and connected between each spring bracket 144 and a pivot bolt 146 passing through the upper forward corner of each lever arm 140 is a coiled spring 148, preferably having a fairly constant length to force ratio.

Further bracing is added to the supporting frame 4 by diagonally extending rods 150, 152, 154 and 156, all of which are connected at their inner ends to a plate 158 having a longitudinally extending slot 160 therein through which extends a guidebolt 162 carried by the rotatable tubular member 108. The forward ends of the rods 150 and 152 are engaged in holes provided in plates 164 welded to the tubular member 70, and the rear ends of the rods 154 and 156 are similarly connected to plates 166 welded to the rear brace assembly 64.

The hydraulic jack 126 is utilized to move the central support system 104 from the working position of FIGS. 1—6 to the road transport position of FIG. 7. In FIGS. 1—6 the end caster support wheels 80 and 84 and the central support wheels 138 are in engagement with the ground G, and the weight of the inherently flexible frame of the implement is borne in part by the end support wheels 80 and 84 and in part by the central wheels 138. The piston rod 168 of the hydraulic jack 126 is retracted when the support system 104 is in a working position, and rearward travel of the crank arm 114 is limited by a stop pin 170 carried by a bracket 172 welded between the tubular members 30 and 34. Upward travel of the central support wheels 138 is thus limited by engagement of the stop portions 142 of the lever arms 140 with the tubular member 108, and by engagement of the crank arm 114 with the stop pin 170.

When it is desired to move the central support system 104 into the road transport position, the hydraulic jack 126 is operated to extend the piston rod 168. This drives the arm 120 against the stop 124, and then moves the crank arm 114 counterclockwise in FIG. 7. As the crank arm 114 pivots the lever arm, stops 142 engage the tubular member 108, and further movement of the crank arm 114 then elevates the supporting frame 4 above the wheels 138 until the caster wheels 80 and 84 and the scraper blade 86 are raised clear of the ground G, as shown in FIG. 7. A lock pin 174, slidably mounted within a tubular housing 176 carried by the bracket 172, is then slid behind the crank arm 114 to secure it in the transport position. The hydraulic jack 126 can then be deactivated, if desired. The tubular housing 176 has an axial slot 178 and a pair of circumferentially extending slots 180 and 182 therein, and the lock pin 174 has a handle 184 that projects through said slots (FIG. 3). The outer circumferential slot 180 receives the handle 184 to secure the pin 174 in a retracted position, and the inner slot 182 secures said lock pin in its advanced position.

It is desirable to have some means for mechanically adjusting and operating the crank arm 114, and for this purpose a rod 186 can be connected to the upper end of the arm 120. The rod 186 leads to a suitable mechanical adjustment lever (not shown) mounted on the supporting frame 4.

When the central support system 104 is in the working position of FIGS. 1—6 the lever arm stops 142 are normally elevated above the tubular member 108, the springs 148 acting through the lever arms 140 being of sufficient strength to ensure this happening. Thus, the wheels 138 are resiliently mounted. The forces acting on the central support system 104 and the central portion of the land smoother 2 are analyzed in FIG. 5, wherein the implement is shown to be operating on firm ground $G_F$.

When the implement is in operation a certain amount $W_{FE}$ of the total weight $W_{FT}$ thereof is borne by the caster FC80 and 84 at the opposite ends of the longitudinally flexible supporting frame 4. However, because the relatively rigid supporting frame 4 is inherently flexible in the longitudinal direction, a portion of the weight thereof, designated $W_{FC}$, is concentrated over the central support system 104. The weight $W_{FC}$ is balanced by an upward reacting force $F_{CG}$, the force $F_{CG}$ passing vertically through the axis of the wheel axle 136. The relationship between the forces $W_{FC}$ and $F_{CG}$ is expressed as follows:

$$(1)\ W_{FC}=F_{CG}$$

Referring to FIG. 5, it is seen that the force $F_S$ of the spring 148 is utilized to counterbalance the weight $W_{FC}$, the spring 148 being chosen so that the force $F_S$ remains relatively constant over the working length thereof. The force $F_S$ acts on the supporting arm 132, which is pivotally mounted on the shaft 130. A moment arm $b$ extends between the center of the shaft 130 and the center of the axle 136, and a longer moment arm $a$ extends from the center of the shaft 130 to the center of the connecting pin 146. The moment arm $a$ extends at an angle of about 155°—160° from the moment arm $b$, and is about half again as long as the moment arm $b$.

The coil spring 148 is mounted so that the longitudinal axis thereof remains generally horizontal over the working range of the support system 104, within about 10°. The force $F_S$ of the spring lies on the longitudinal axis thereof, and said axis defines an angle A with the moment arm $a$ that increases in value as the wheel 138 moves downwardly relative to the frame 4, and *vice versa*. When the outer end of the support arm 132 pivots downwardly the angle A is increased, and the slope of the moment arm *b* changes. The stop 142 limits upward movement of the outer end of supporting arm 132 to establish a minimum value for the angle A, the moment arm *b* being generally horizontal when the stop 142 is engaged with the member 108.

If now forces are balanced about the shaft 130 in FIG. 5, the following equation results:

(2) $aF_{SN}=bF_{CG_N}$, wherein:

$F_{SN}$ = the normal component of $F_S$
$F_{CG_N}$ = the normal component of the vertical force $F_{CG}$ It is readily seen that:

(3) $aF_{SN}=aF_S \sin A$ (4) $F_{CG_N}=\dfrac{F}{CG \cos B}$

Rearranging, the following relationship is obtained:

(5) $F_{CG}=\dfrac{aF_S \sin A}{b \cos B}$ wherein:

*a* and *b* are constants
   $F_S$ is generally constant

From equation (5) it is seen that the angles A and B are the principal variable factors. With proper design, wherein A varies over an operating range of about 20° to about 50° and B varies over an operating range of about 0° to about 40°, it is thus evident from equation (5) that $F_{CG}$ will increase progressively as the angle A increases, that is, as the wheels 138 move downwardly relative to the supporting frame 4. The importance of this progressive increase in $F_{CG}$ is apparent from equation (1), and the following equation:

(6) $W_{FT}=W_{FC}+W$, where $W_{FE}$ = the weight borne by the end support means.

Since from equation (1) it is seen that $W_{FC}=F_{CG}$, then from equation (6) it is apparent that as the wheels 138 move progressively downward with an accompanying increase in $F_{CG}$, there will be a corresponding drop in $W_{FE}$. The central support system 104 thus functions to adjust the proportions of the weight $W_{FT}$ carried by the end support wheels 80 and 84, and the central support wheels 138.

In FIG. 6 the implement 2 has moved from the firm soil $G_F$ onto softer soil $G_S$, so that the support wheels 138 will sink in. Proper operation of the wheels 138 is in part assured by having the support arms 132 extend forwardly rather than rearwardly, for if said wheels 138 were mounted in the latter manner they would tend to merely ride over changes in the soil and would not tend to sink or bite in. When the wheels 138 have sunk into the soil as shown in FIG. 6 the angle A will be increased in value to become the angle A', the angle B will increase to become the angle B', the force $F_{SN}$ will increase in value to become the force $F_{SN}'$, and the force $F_{CG}$ will increase to become the force $F_{CG}'$. The increase in $F_{SN}$ to $F_{SN}'$, exerts a net upward force on the supporting frame 4, urging it to flex upwardly rather than in the usual downward direction. This action is best understood by comparison with a conventional spring-mounted wheel, and functions to control the elevation of the fixed scraper blade 86 relative to a plane engaging the bottom surface of the end wheels 80 and 84.

In the conventional spring-mounted wheel the spring is mounted to exert a force tending to separate the wheel from its frame. But unlike in this invention, when the wheel in the conventional arrangement moves downwardly relative to its frame the spring force decreases, allowing the frame to sag or deflect downwardly. Here, when the wheels 138 move downwardly relative to the frame 4 the separating forces generated by the coil springs 148 increase in value, whereby the frame 4 is urged to deflect upwardly, rather than downwardly. The action of the supporting system 104 thus functions not only to transfer weight between the wheels 138 and the wheels 80 and 84, but also to control the position of the scraper blade 86, even in the presence of changing soil conditions. The implement 2 of the invention is thus enabled to approach the ideal performance which a perfectly rigid supporting frame would produce. In addition, the central support wheels 138 are arranged for transport use, and they add lateral stability to the implement.

The concept of the central support system 104, to repeat, is to reverse the usual relationship between a resiliently mounted wheel and its supporting frame, whereby as the wheel moves downwardly relative to the frame the spring force separating the wheel from the frame is increased rather than decreased. This concept might be carried out by other arrangements than shown in the drawing, and can be utilized in equipment other than a land smoothing implement.

Obviously, many modifications and variations of the present invention are possible in the light of the above teachings. It is, therefore, to be understood that within the scope of the appended claims the invention may be practiced otherwise than as specifically shown and described.

I claim:

1. In a land smoothing implement including an elongated relatively rigid frame means having a degree of inherent flexibility in the longitudinal direction, said frame means being carried at its opposite ends on end support means and having at least one scraper blade mounted centrally thereon; support means positioned centrally of said frame means, comprising: at least one supporting arm extending longitudinally of said frame means and pivoted centrally thereof to said frame means for pivotal movement in a vertical plane about a horizontal pivot axis, one end of said supporting arm having a connection point thereon, and a straight line passing through said pivot axis and said connection point defining a first moment are "*a*"; a ground-engaging wheel mounted on an axle carried by the other end of said supporting arm, a straight line passing through the center of said axle and said pivot axis defining a second moment arm "*b*"; and spring means connected between said frame means and said spring connection point for exerting force "$F_S$" along a spring force axis passing through said connection point, said spring force axis extending at an angle "*A*" to said first moment arm "*a*," and said force "$F_S$" being exerted in a direction along said spring force axis to urge said wheel-bearing end of said supporting arm to pivot downwardly, said spring means and the lengths of said moment arms "*a*" and "*b*" being chosen so that a vertical force "$F_{CG}$ passing upwardly through the center of said axle increases progressively when said wheel-bearing end of said supporting arm moves progressively downward, and vice versa, in accordance with the following equation:

$$F_{CG}=\dfrac{aF_S \sin A}{b \cos B}$$

wherein:

B = the angle defined between a vertical line passing through the center of said axle, and a line emanating from the center of said axle and which extends perpendicular to said moment arm "*b*,"

so that a progressively increasing upward force is exerted on said frame means as said wheel moves progressively downward relative to said frame means, and vice versa, whereby to effect adjustment of the relative proportions of the weight of said implement borne by said end support means and said centrally positioned support means.

2. In a land smoothing implement as recited in claim 1, wherein said support means includes a pair of longitudinally disposed, transversely spaced supporting arms, each having a ground-engaging wheel mounted thereon.

3. In a land smoothing implement as recited in claim 2, wherein said supporting arms are disposed in front of and extend forwardly from said scraper blade, said wheels being mounted on the forward ends of said supporting arms.

4. In a land smoothing implement as recited in claim 3, wherein said wheel-bearing ends of said supporting arms are movable a relatively constant length to force ratio, said spring means, said supporting arms and said lever arms cooperating as said wheels carried by said supporting arms move progressively downwardly relative to said frame to exert a progressively increasing upward force on said frame, and vice versa, whereby to effect adjustment of the relative proportions of the weight of said implement borne by said wheels.

5. In a land smoothing implement as recited in claim 1, wherein said one end portion of said supporting arm has an upwardly extending lever arm thereon, said connection point being on the upper end of said lever arm.

6. A land smoothing implement, including: an elongated relatively rigid frame having a degree of inherent flexibility in the longitudinal direction; end support means at the opposite ends of said frame; at least one scraper blade mounted centrally on said frame; and support means positioned centrally of said frame, said central supporting means comprising: a transversely disposed member rotatably mounted on said frame, and having a pair of bracket arms extending forwardly therefrom; means connected between said frame and said transversely disposed member, operable to rotate the latter for positioning said bracket arms in a desired position; a supporting arm pivoted centrally thereof to each of said bracket arms for pivotal movement in a vertical plane, said supporting arms being interconnected and each having an upwardly extending lever arm on its rear end and a wheel mounted on its forward end, at least one of said lever arms including a stop engageable with said transversely extending member to limit upward pivoting of the forward ends of said supporting arms; and spring means connected between said frame and the upper end of each lever arm and having downwardly sufficiently to elevate said scraper blade to thus equip said implement for road transport, and including means operable to move said supporting arms into said road transport position.

7. An implement as recited in claim 6, wherein said spring means comprises a coil spring for each lever arm, each of said coil springs extending generally horizontally, the rear end of each coil spring being connected to its associated lever arm, and the forward end of each coil spring being connected to said frame forwardly from said lever arms.

8. An implement as recited in claim 7, wherein said means operable to rotate said transversely disposed member includes a hydraulic jack.